United States Patent [19]
Gordecki et al.

[11] Patent Number: 5,508,124
[45] Date of Patent: Apr. 16, 1996

[54] CONFINED BATTERY DOOR

[75] Inventors: Ryszard J. Gordecki; Kian T. Tan, both of Singapore, Singapore

[73] Assignee: Motorola, Inc., Schaumburg, Ill.

[21] Appl. No.: 294,458

[22] Filed: Aug. 23, 1994

[51] Int. Cl.⁶ .................................................. H01M 2/10
[52] U.S. Cl. ............................................ 429/97; 429/100
[58] Field of Search ................................ 429/96, 97, 100

[56] References Cited

U.S. PATENT DOCUMENTS

| | | | |
|---|---|---|---|
| 4,204,608 | 5/1980 | Gatto | 220/335 |
| 4,391,883 | 7/1983 | Williamson et al. | 429/97 |
| 5,206,098 | 4/1993 | Cho et al. | 429/96 |
| 5,248,569 | 9/1993 | Pine et al. | 429/97 |
| 5,342,707 | 8/1994 | Brooks | 429/97 |
| 5,372,395 | 12/1994 | Yang | 429/96 X |
| 5,415,955 | 5/1995 | Kobayashi et al. | 429/97 |

OTHER PUBLICATIONS

"BRAVO" SERIES GSC and POCSAG Alphanumeric Display Pagers, Motorola Service Manual, cover page and pp. 2 and 10, ©1989 by Motorola, Inc., Paging Products Group. Month Unknown.

"BAVO" Encore! Numeric Display Series Radio Pagers, Motorola Theory/Maintenance Manual, cover page, index page and pp. 6, 7 and 10, ©1993 by Motorola, Inc., Paging and Wireless Data Group.

*Primary Examiner*—Stephen Kalafut
*Attorney, Agent, or Firm*—Philip P. Macnak

[57] ABSTRACT

A removable battery door clip has opposed pivoting stubs (176) for the door to be pivotally anchorable to a housing (20) and at least one projection (152) for the door to be snappably fastened with at least one retaining slot (234) of the housing.

9 Claims, 7 Drawing Sheets

5,508,124

CONFINED BATTERY DOOR

CROSS REFERENCE TO RELATED APPLICATIONS

This application is related to U.S. application filed on the same day as the present invention, entitled "A FOUR-SIDED HOUSING LATCH" and assigned to Motorola, Inc.

TECHNICAL FIELD

This invention relates in general to battery doors and particularly to battery doors for an electronic device, such as a pager.

BACKGROUND

Small portable electronic devices, such as selective radio receivers, commonly called pagers, require battery operation for portability. To allow battery access and to maintain the battery within a battery receptacle in the pager housing, a battery door is often used. However, because of their small size, prior art battery doors were often misplaced or accidentally removed. Therefore, there is a need for a battery door design that secures the door to the pager while allowing easy access to the battery without increasing the size of the pager.

SUMMARY OF THE INVENTION

Briefly, according to the invention, there is provided a removable battery door clip pivotally anchorable to a housing and snappably fastened with retaining slots of the housing.

DETAILED DESCRIPTION OF THE PREFERRED EMBODIMENT

Figure 1:
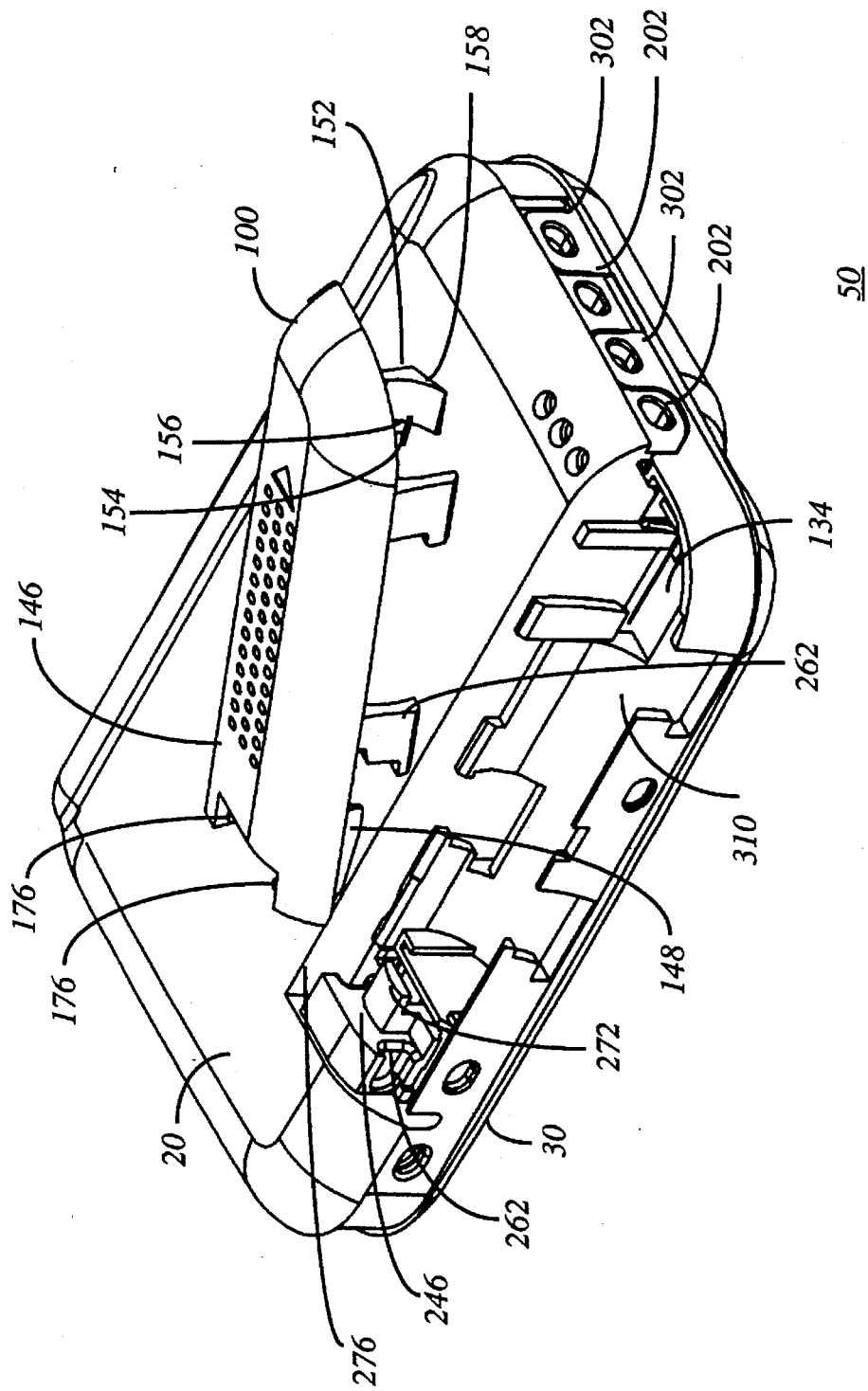
FIG. 1 is an illustration of an assembled pager housing and a loose or removable battery door, before insertion, in accordance with the present invention.

Referring to FIG. 1, an assembled pager housing 50 and a loose or removable battery door 100 are illustrated. The assembled pager housing 50 includes a pager front housing 30 interlocked with a pager back housing 20 by their respective alternating tabs 302 and 202. Both housings 20 and 30 and the door 100 are fabricated from a resilient material such as polycarbonate, commonly called plastic. Various means for fastening the back housing to the front housing can be integrally formed on the housing themselves, without resorting to a separate fastening part. For example, the walls of both of these housings are slotted to form the tabs 302 and 202. In addition, a narrow tapered tab 282 protruded from the back housing is aligned with and can be received by a corresponding finger-shaped slot 382 cut in the front housing to substantially align the back housing's tongue 272 on top of the top edge of the front housing's battery compartment 310.

Unassembled, the back housing 20 can be viewed as cut-away to form a substantially rectangular opening having a long side and a short side. This opening may be of any other shape to accommodating a correspondingly shaped battery which is usually in the shape of a cylinder.

Correspondingly, a substantially cylindrically or rectangularly shaped battery cell compartment 310 is formed from the walls of the front housing 30 for receiving the battery.

Figure 2:
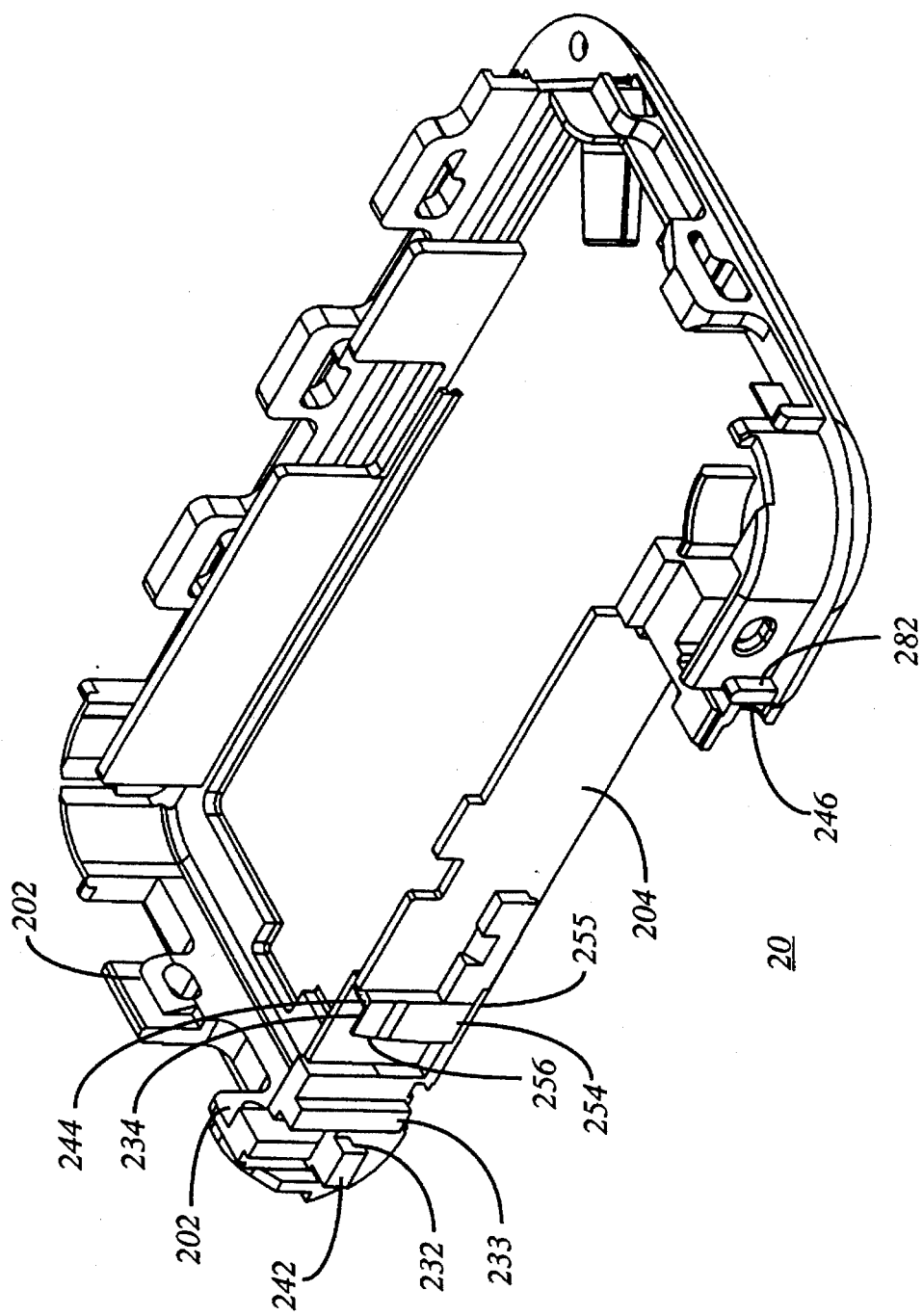
FIG. 2 is an illustration of the back housing 20 of FIG. 1, in accordance with the present invention.

Referring to FIG. 2, an inner sidewall 204 having at least one retaining groove is integrally attached to the back housing at the long side of the opening. Preferably, a horizontal end groove 232 is formed by an L-shaped projection 242. Another projection 233, serving as an alignment stop, extends from the sidewall next to the smaller L-shaped projection 242. A vertical groove is similarly formed from a longer L-shaped projection 244. This vertical projection 244 includes an extended partial sidewall 254 for forming a substantially vertical L-shaped recessed channel or slot 234 with the alignment stop 233. However, the recessed channel 234 is closed-off by the top edge 255 of the partial sidewall 254 to maintain pivotal movement of the battery door only within the recessed channel 234 (to be described later). Preferably the partial sidewall 254 has an arcuate edge 256. On the other end, another horizontal groove 276 is partially formed by a substantially capitalized I-shaped support 246 integrally attached, at the top, to the back housing at the short side of the opening. The base of the support is also integrally attached to the housing approximately midway up the sidewall 204 to finish forming the horizontal groove 276. FIG. 1 shows the I-shaped support 246 more clearly as having two opposed side arcuate finger indentations 266.

A supportive projection or tongue 272 is extended horizontally approximately midway up the I-shaped support 246. The top of the tongue 272 is preferably rounded to accommodate the similarly rounded underside of the battery door 100.

Figure 4:
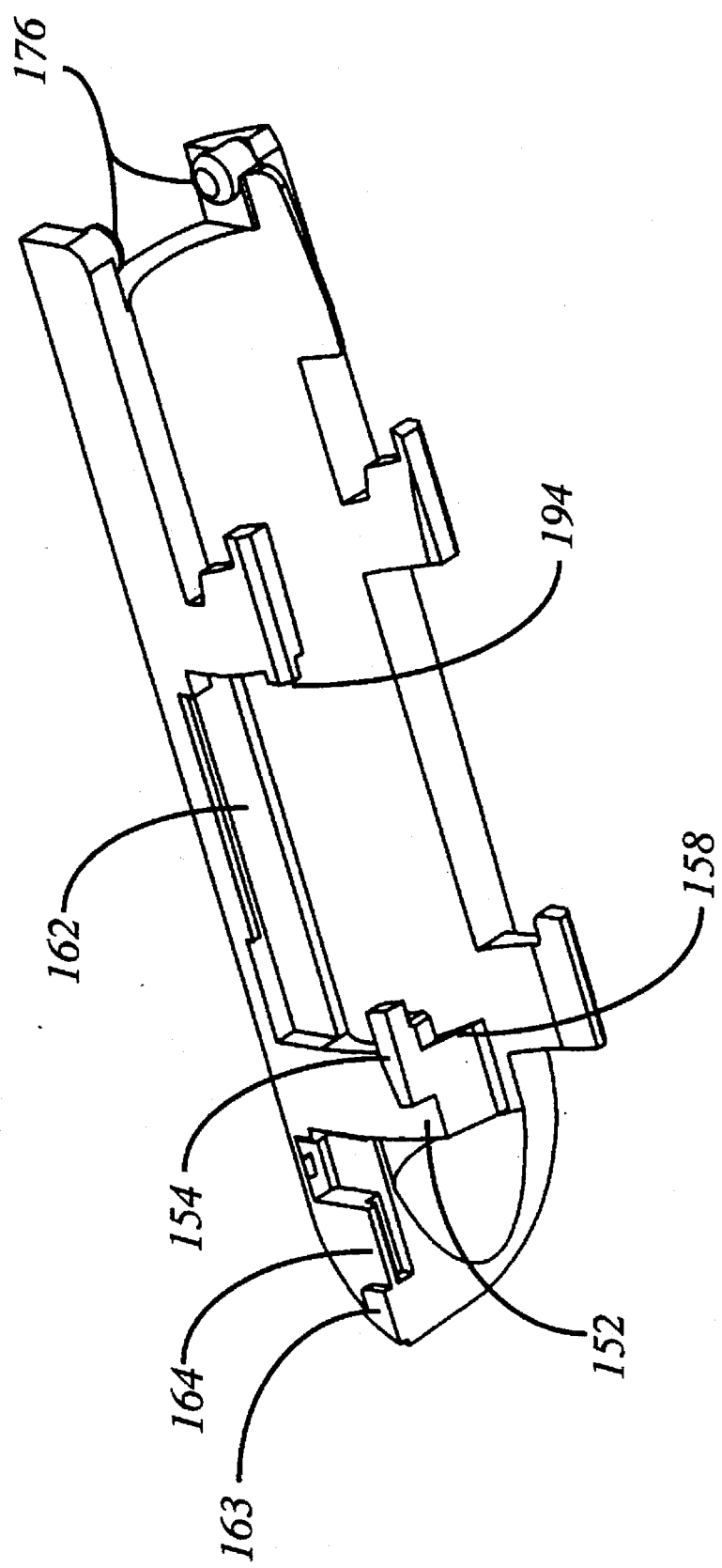
FIG. 4 shows an inward and underside of the battery door 100 of FIG. 1, in accordance with the present invention.

Referring again to FIG. 1 and to FIG. 4, the battery door, in the form of a clip and having a frame to compete the back surface of the back housing, includes first 146 and second opposed end portions and an intermediate portion.

Preferably U-shaped, the first end portion 146 is slidably insertable and pivotally anchorable to the I-shaped support 246 of the back housing. A pair of inwardly opposed side stubs 176, preferably in the shape of round pegs, are integrally attached on the lower corners of both legs of the "U". These round pegs 176 form a partial hingeable axis resting against the support 246 of the back housing for pivotally mounting the door to the housing at the arcuate indentations 266 of the support, after the U portion of the door is slidably inserted within the groove 276. With the underside of the battery door resting against the top of the tongue 272 of the back housing, the pegs 176 of the door allow the door to slide along the horizontal groove 276 of the back housing until horizontally stopped by the alignment stop 233 of the back housing.

The first end portion 146 also includes one alignment fin 148 spaced at least a sidewall width away from the edge of the battery door 100 for positioning the fin on the inward side of the front housing wall.

The intermediate portion includes at least one elbow member 152. This elbow 152, preferably in the form of a projecting leg with associated parts, extends downwardly from the door for latchibly securing the leg of the door, within the channel 234, after the door has been pivotally closed. A lip 154, horizontally extending outwardly from the leg and forming the elbow turn, pivotally slides behind the partial sidewall 254 when the door is horizontally slid backward to allow the pivotal tilting of the leg within the channel 234. A stop or stub 156, extending inwardly from the lip, forms a foot for the leg for resting against the corner of the partial sidewall 254 to prevent upward movement when the door is slid forward to lock into place. Preferably, the edge of the stub 156 follows the shape of the sidewall's edge 256 to allow smooth pivotal movement of the stub, up the arcuate edge of the sidewall, when the stub is pushed backwards into the channel 234. Beyond the stub 156, a battery ejection member preferably in the form of a partial inwardly curled hook 158, extends from the leg to resiliently slip around a battery 10 and lift it up when the door is tilted upward in the forward and pivoting direction 1 of FIG. 5 for allowing battery movement in or out of the assembled pager.

The second or free end portion includes at least one recess 162 for slidably receiving the alignment stop projection 233 of the back housing. A slight recess on the side surface, provided by a corner stop 163, of the door forms a small channel 164 for snapping shut or locking the door to the small L-shaped projection 242 of the back housing.

Figure 5:
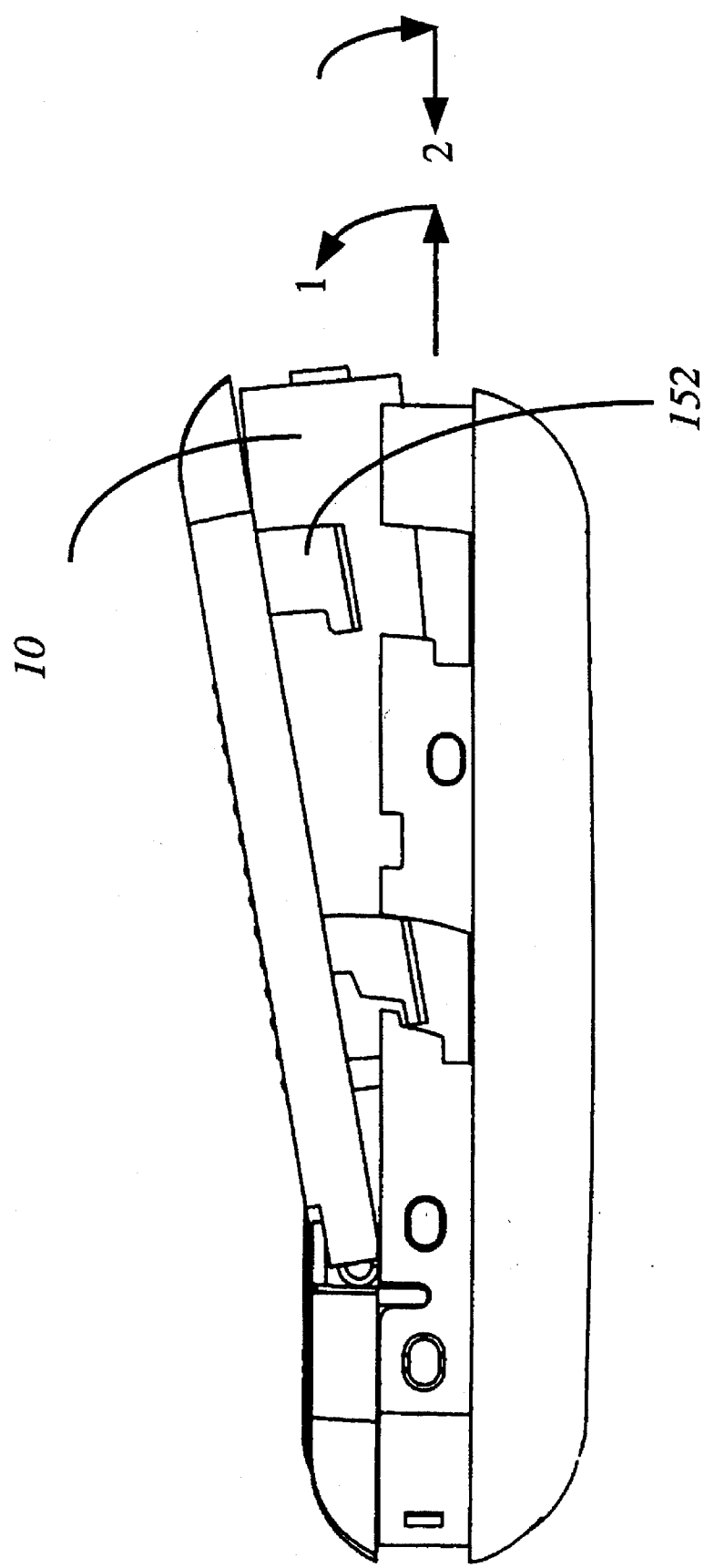
FIG. 5 shows the allowable tilt of the battery door when assembled to the pager housing, in accordance with the present invention.

When locked in the inward direction 2 of FIG. 5, the removable battery door 100 with its U-shaped pivotal end abutted against the back housing, filling the cut-away space, completes the back surface of the back housing. The door 100 and the cut-away back housing 20 now forms an assembled, stand-alone, or complete back housing that can be interlocked with the front housing having corresponding slots to receive the back housing.

Figure 3:
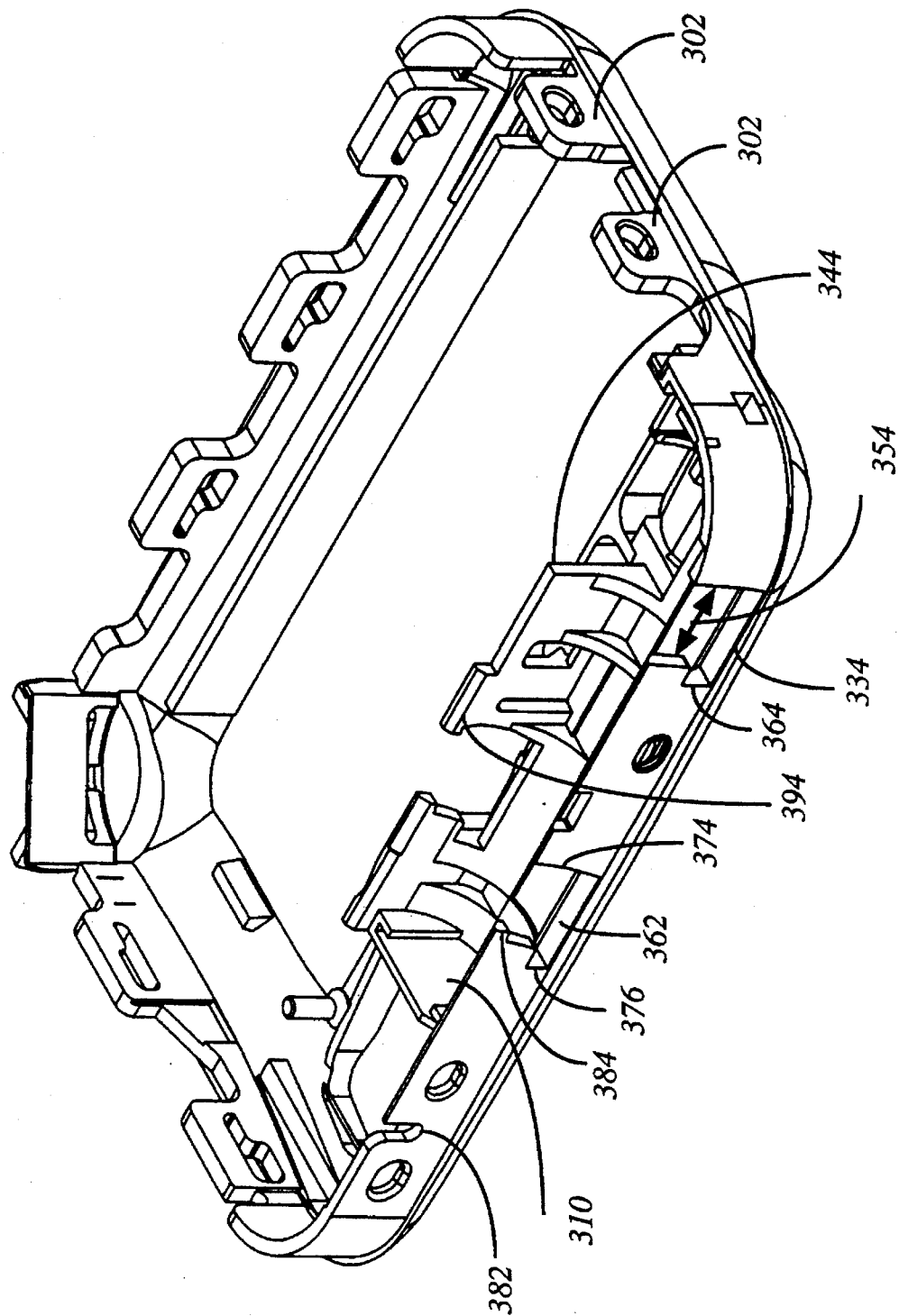
FIG. 3 is an illustration of the front housing 30 of FIG. 1, in accordance with the present invention.

Referring to FIG. 3, if additional locking features are desired, a similarly shaped L-shaped back slot 334 is cut in the wall of the front housing or of the battery compartment wall, opposite the vertical L-shaped recessed channel 234 of the back housing when the back housing is seated in a corresponding opening 344 of the front housing's battery compartment wall. As on the opposed side, the leg 354 of "L" is wider and slightly sloped upwardly more than the foot 364 of the "L" to allow pivotal movement of a corresponding shaped second opposed elbow 134 of the battery door 100 while the elbow 134 is within the leg 354 channel. Since this back L-shaped slot 334 of the front housing is situated lower than the corner of the partial sidewall 254 of the back housing, when assembled, and is situated farther back from the pivot point 176, the top end of the leg 354 is OPEN to allow the full pivotal movement, available at the back of the door lever, of the door's elbow 134 above the leg 354 aperture. However, when the elbow 134 of the battery door is slid inward abutting the foot 364, the correspondingly shaped tip of the door's elbow 134 is captured within the narrowly confined foot 364 of the front housing's L-shaped aperture.

Furthermore, one or both of the opposed walls of the front housing or of the battery compartment 310 can be formed with at least one front staircased-shaped slot 362 for receiving a correspondingly shaped elbow 262 of the door 100 such that each of the elbow is removably catchable with the at least one slot 362 of the front housing. As on the back L-shaped slot 334, the width 374 of staircased-shaped slot is wider and curved upwardly more than the foot 376 of the "staircase" to allow pivotal movement of a corresponding shaped double elbow 134 of the battery door 100 while the double elbow 134 is within the staircase 374 channel's width. Since this front staircase-shaped slot 362 of the front housing is situated closer to the pivot point 176 where upward pivotal movement is less available than in the back, the top projection 384 of the front housing's wall protrudes into the width of the slot 362 to form the top step or rung of the staircase slot and to inhibit pivotal movement beyond this step 384. However, when the double elbow 262 of the battery door is slid inward abutting the foot 376, the correspondingly shaped tip of the door's double elbow 262 is captured within the narrowly confined foot 376 of the front housing's staircase-shaped aperture. Moreover, one or both of the battery door's double elbows 262 is formed with an additional protruding heel 194 of FIG. 4 for stoppage of pivotal movement against a correspondly shaped stop 394 of the front housing's battery cell compartment wall.

Figure 6:
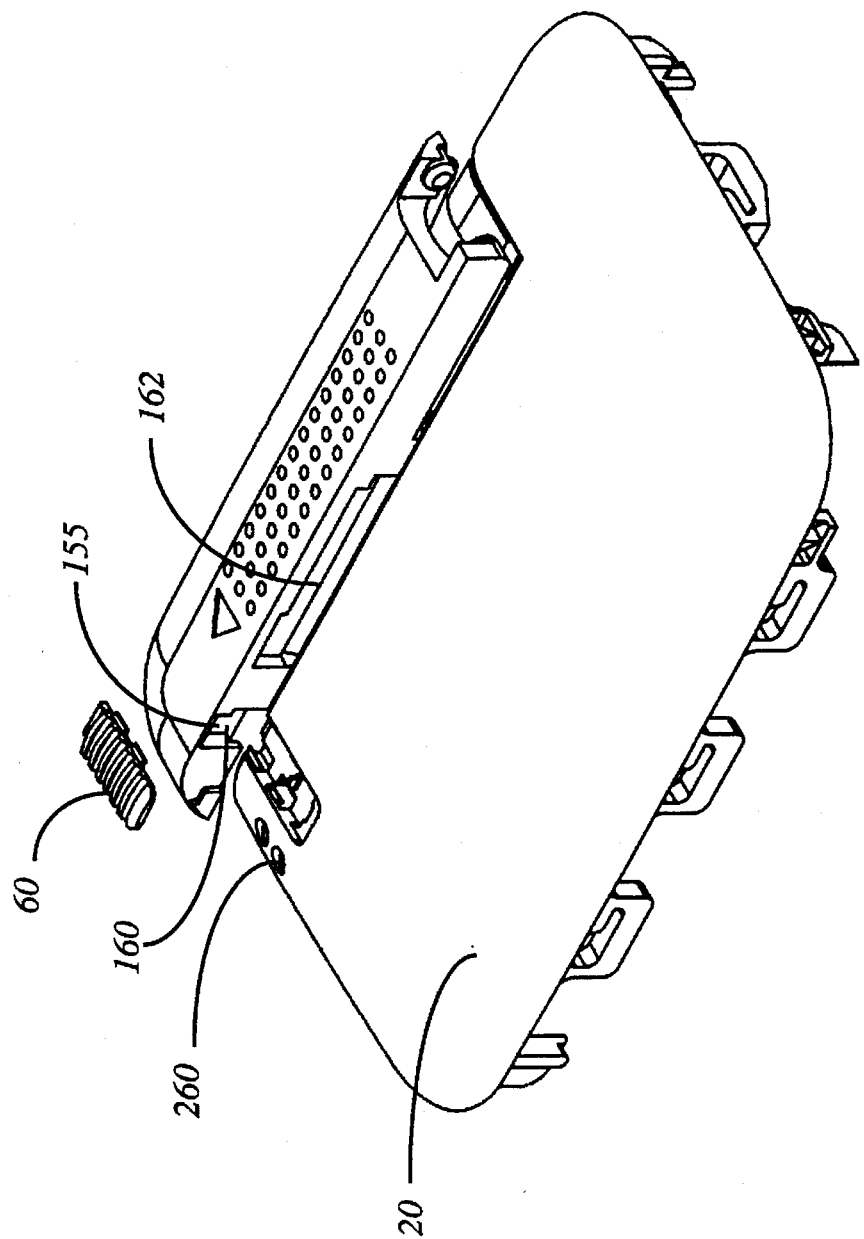
FIG. 6 shows an optional positive slim profile lock assembly, in accordance with the present invention.
Figure 7:
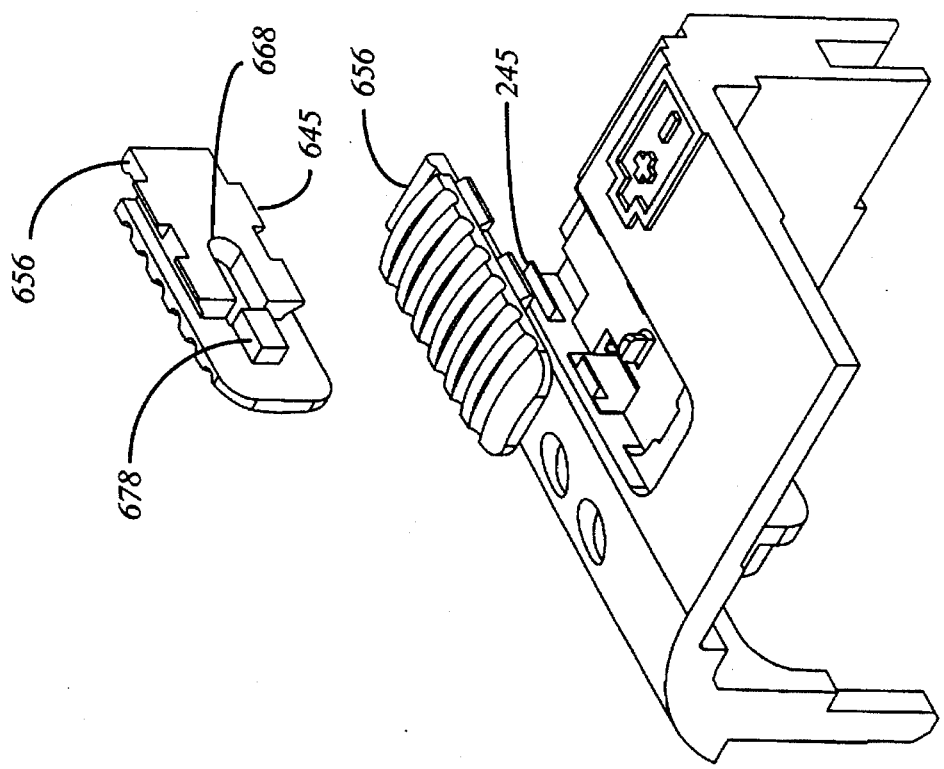
FIG. 7 shows the back housing with the lock of FIG. 6, in more detail, in accordance with the present invention.

Referring to FIGS. 6 and 7, an additional lock to further secure the battery door 100 to the back housing, the inward side of the battery door 100 is recessed with a cavity 160 for mating with an optional positive slim profile (less than the width of the housing surface) lock assembly, preferably in the form of a sliding lock 60 dovetailed in between a corresponding slim cavity 260 on the back surface of the back housing and the battery door cavity 160. The positive lock 60 includes two pairs of opposed engagement tabs preferably in the form of forty-five degree nails 645, commonly called dovetails, slidable below corresponding dovetailed channels 245 of the back housing. A tail snap or latch in the form of a locking bump 655 snaps lock shut the lock 60 with a miniature lip 155 of the battery door cavity 160. A center channel 668 allows the sliding movement of the lock 60 while a stopper 678 on the lock abuts against a center protrusion of the back housing's cavity 260 to prevent the miniature lock 60 from falling out.

In summary, a removable battery door clip has opposed pivoting stubs 176 for the door to be pivotally anchorable to the pager back housing 20 and projecting legs or elbows 152 and 134 for the door to be snappably fastened with retaining slots of the housing.

What is claimed is:

1. A removable battery door clip, comprising:

a battery door frame for completing the back surface of a housing;

opposed pivoting stubs on one end of the frame for the frame to be pivotally anchorable to a housing, wherein the one end of the frame comprises a U-shaped pivoting end; and at least one projection extending from the frame for the frame to be snappably fastened with the housing.

2. The door clip of claim 1 wherein the at least one projection comprises a catchable elbow member.

3. The door clip of claim 2, wherein the at least one catchable elbow member includes a battery ejection member.

4. The door clip of claim 2, wherein the at least one catchable elbow member comprises a projecting leg having a foot at the base of the leg.

5. The door clip of claim 2, wherein the at least one catchable elbow member comprises an arcuate double elbow.

6. The door clip of claim 2, wherein the at least one catchable elbow member comprises an arcuate double elbow having a protruding heel.

7. A pager and battery housing assembly comprising:

a pager back housing having at least one projection;

a pager front housing interlocking with the back housing, the front housing having at least one slot; and a battery door clip including first and second opposed end portions and an intermediate portion, the first end portion pivotally anchorable to the back housing;

the intermediate portion including at least one elbow member removably catchable with the at least one slot of the front housing; and the second end portion having at least one recess for slidably receiving the at least one projection of the back housing.

8. An assembled one-piece back housing comprising:

a back housing having a substantially rectangular opening having a long side and a short side, the housing cut-away for forming the opening and for accommodating a battery;

an inner sidewall having at least one retaining groove integrally attached to the housing at the long side of the opening;

a capitalized I shaped support having two opposed side arcuate indentations, the support integrally attached to the housing at the short side of the opening;

a removable battery door having a U-shaped pivotal end and a free end for completing the back surface of the back housing;

a pair of inwardly opposed side stubs integrally attached on the U-shaped pivotal end for forming a partial hingeable axis with the support for slidably and pivotally mounting the door to the housing at the arcuate indentations of the support; and at least one projecting leg extended downwardly from the door for latchibly securing the door after the door has been pivotally closed.

9. The assembled one-piece back housing of claim 8, further comprising:

a sliding lock for wedging the battery door to the back housing, the sliding lock having a width less than the width of the housing surface, wherein the battery door is recessed with a cavity for mating with the sliding lock, the lock comprising:

a dovetailed cavity on a back surface of the back housing;

a wedge having at least one pair of opposed engagement tabs slidable within the dovetailed cavity; and a miniature protrusion on an end of the wedge for mating with the battery door.

\* \* \* \* \*